Dec. 27, 1932. P. W. DES ROCHES 1,892,332
OIL SEAL JOINT FOR COMPRESSOR UNITS
Filed Feb. 9, 1928 5 Sheets-Sheet 2
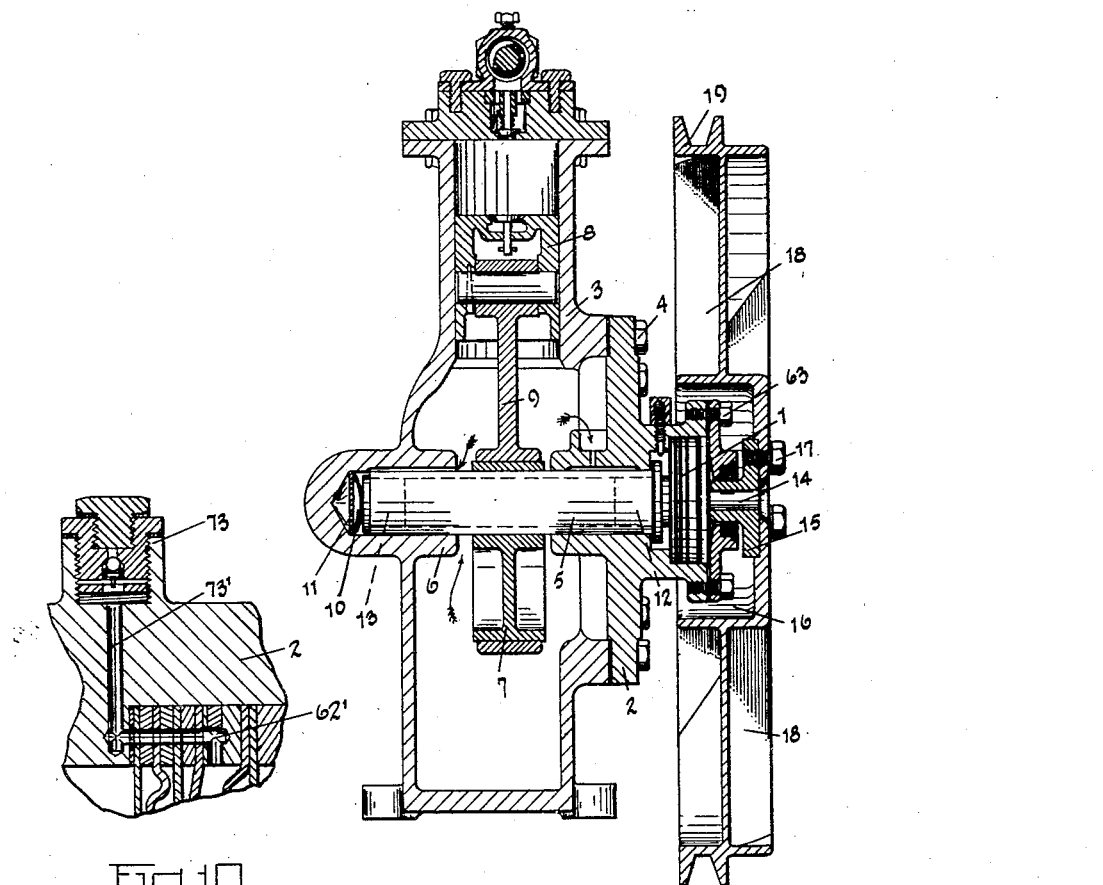
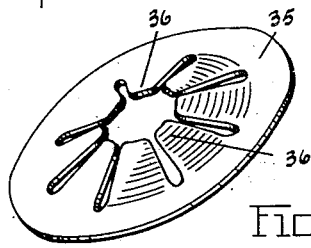
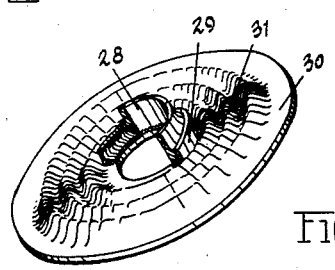
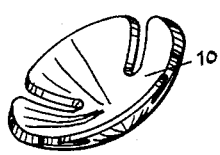
Inventor
Philip W. Des Roches.
By Faust F. Crampton
Attorney Dec. 27, 1932.  P. W. DES ROCHES  1,892,332
OIL SEAL JOINT FOR COMPRESSOR UNITS
Filed Feb. 9, 1928  5 Sheets-Sheet 3
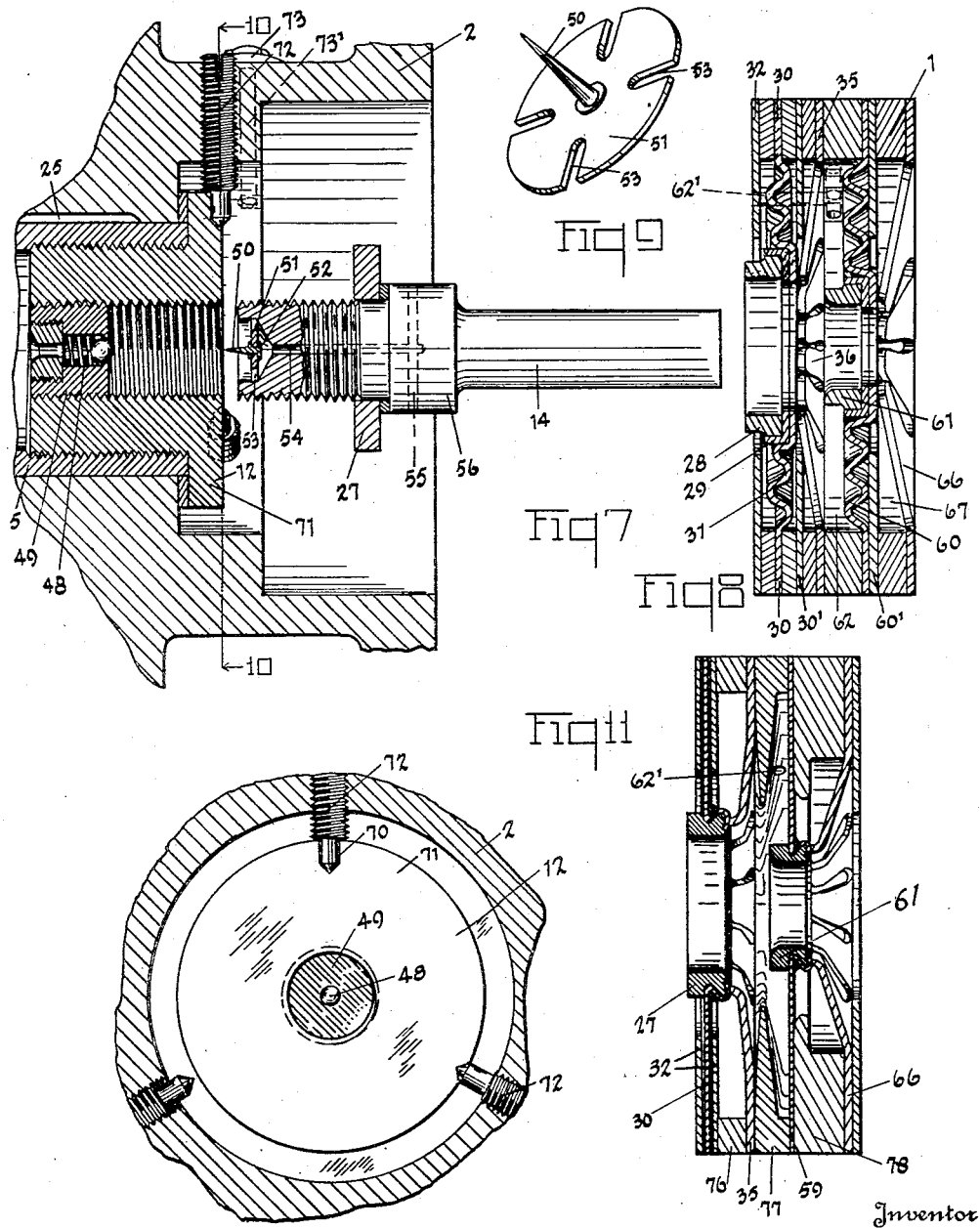

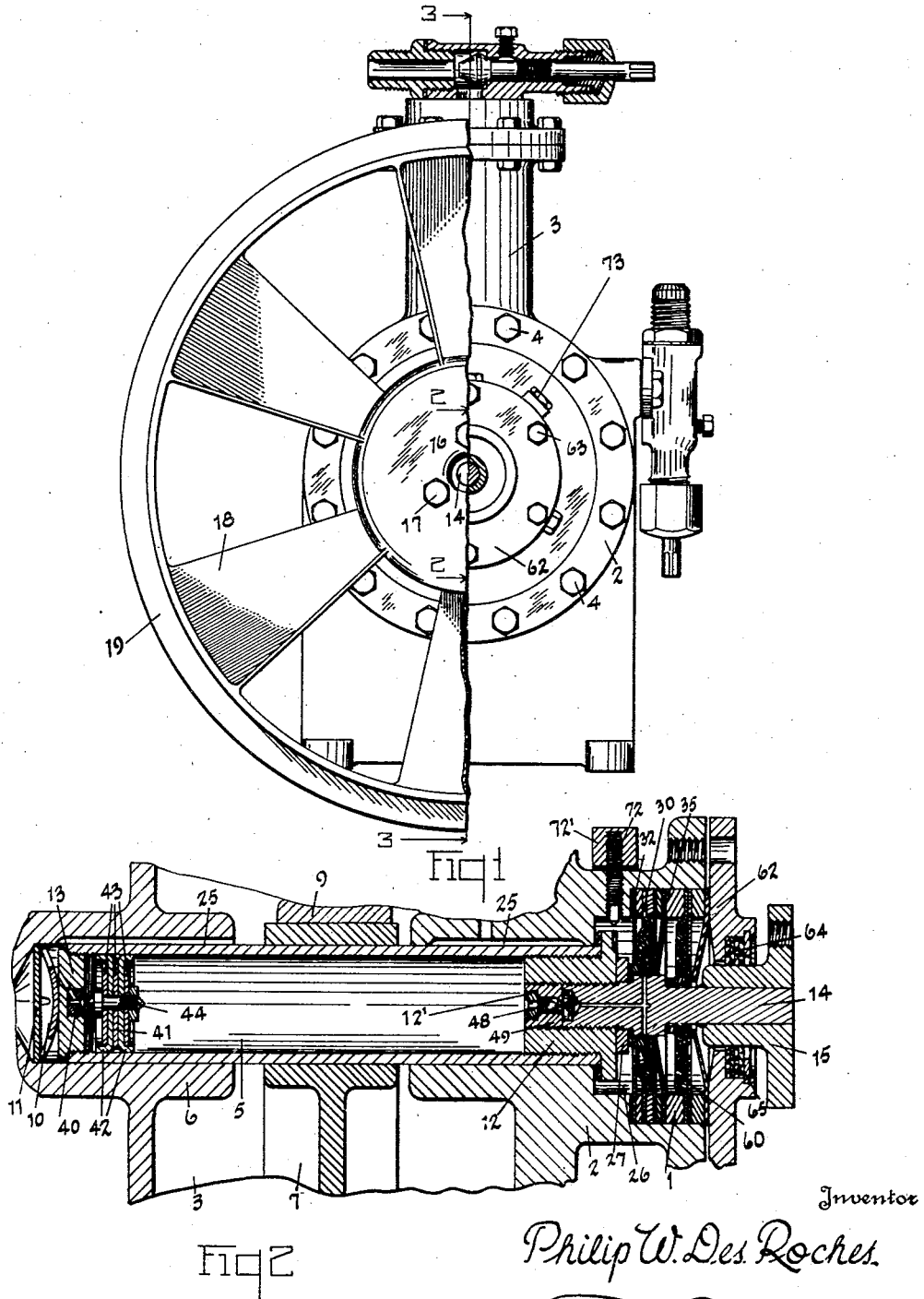

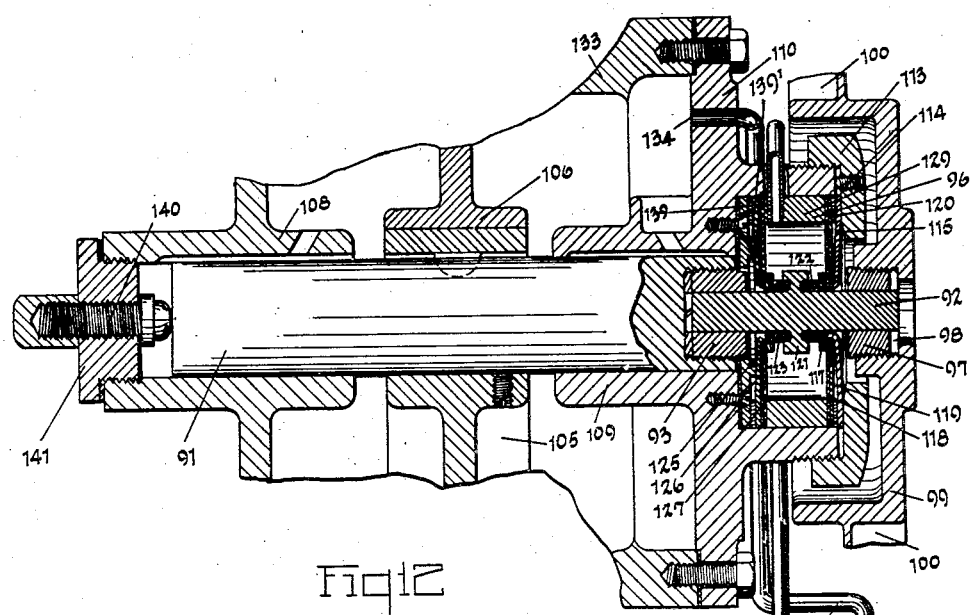
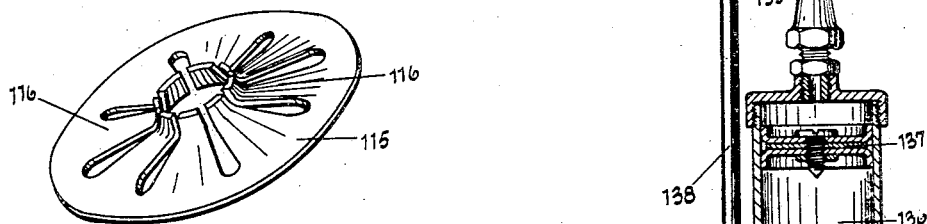
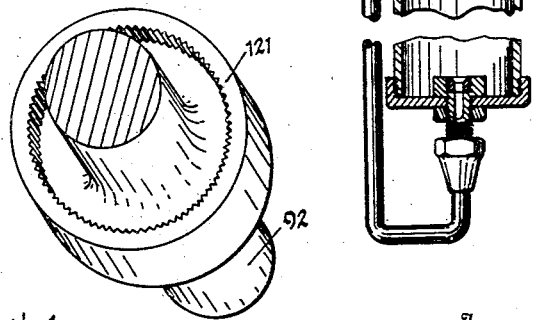

Dec. 27, 1932.   P. W. DES ROCHES   1,892,332
OIL SEAL JOINT FOR COMPRESSOR UNITS
Filed Feb. 9, 1928   5 Sheets-Sheet 5
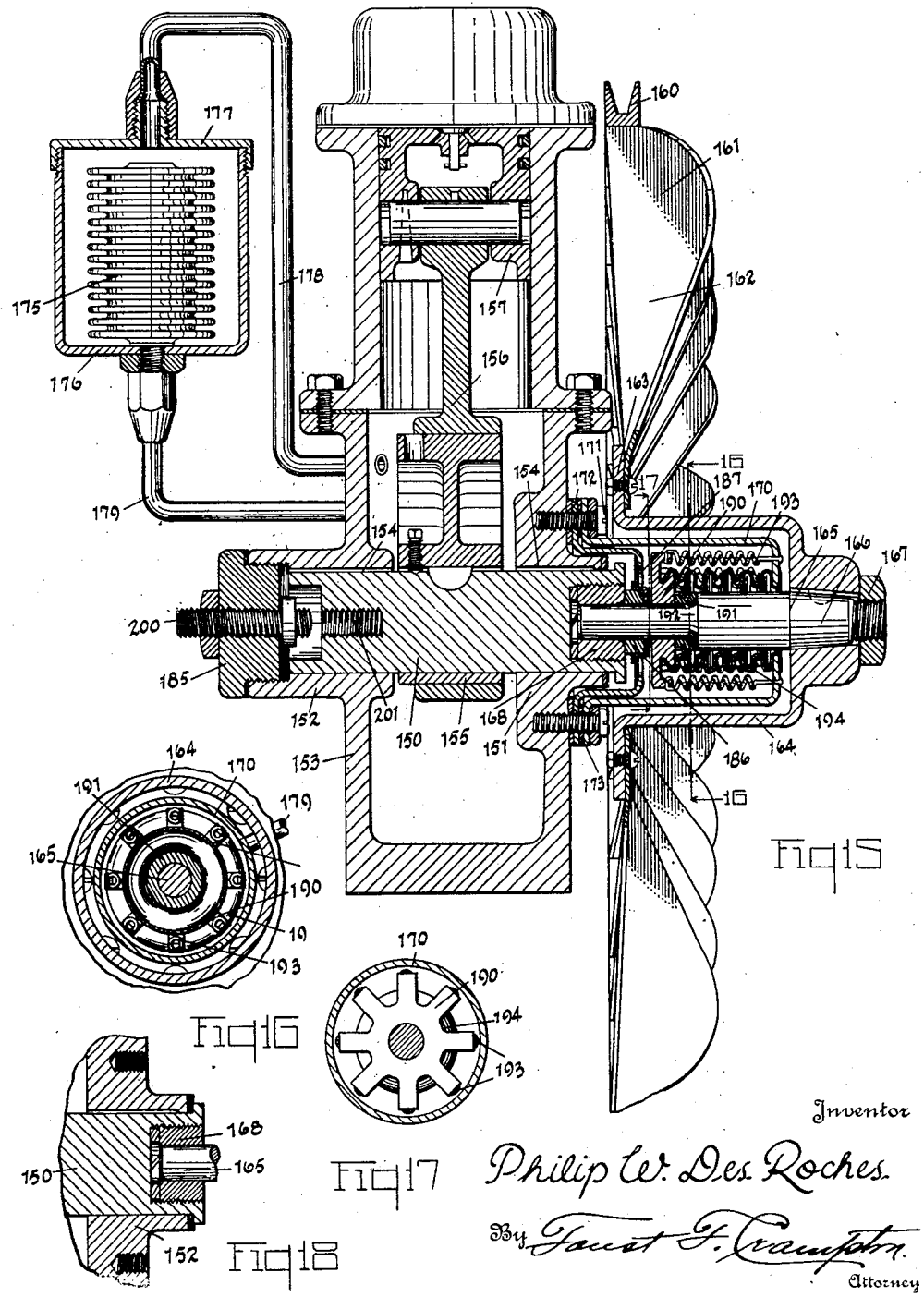
Inventor
Philip W. Des Roches.
By Faust F. Crampton
Attorney Patented Dec. 27, 1932

1,892,332

UNITED STATES PATENT OFFICE

PHILIP W. DES ROCHES, OF DETROIT, MICHIGAN

OIL SEAL JOINT FOR COMPRESSOR UNITS

Application filed February 9, 1928. Serial No. 253,152.

My invention has for its object to provide a means for preventing the escape of materials located within a container. The invention particularly provides a means for preventing the escape of materials between relatively movable parts, or for preventing the escape of materials when parts of a machine, or apparatus, are removed or replaced. The invention may be used to prevent the escape of lubricant used in lubricating operating parts of an apparatus, or a machine, or may be used to prevent the escape of materials as well as the lubricant. Also, the invention has for its object to maintain a lubricant sealing condition notwithstanding any differences of pressure that may exist within or on parts of the machine that are contiguous to the bearings. The invention also provides means for sealing bearing elements of relatively movable parts for preventing the transmission of fluids between the said bearing parts into or out of the apparatus, or the machine.

The invention also provides a means for maintaining lubrication of relative movable parts and also provides for the removal or replacement of relatively movable parts without loss or escape of materials that may be operated upon by the machine, or apparatus. The invention may be used in connection with a great variety of apparatuses and machines and have a great many purposes. When used in compressors of the type employed in refrigeration systems, the compressor, as is well known, is at all times filled with the refrigerant fluid which is circulated under high pressure through other parts of the system and, in order to maintain an easy running relation between the operating parts, a lubricant is also contained within the compressor. The shaft which operates the piston of the compressor, under the pressure of the gas, will, ordinarily, work the oil to the outer ends of the shaft. Also, in case of repair of bearing parts, unless the gas is quite entirely removed, the gas will blow out into the atmosphere, frequently, to great damage of life and property. To avoid leakage and enable repair without loss of gas, I have provided a shaft sealing and bearing construction.

The invention may be contained in machines which may vary in their details of construction and used for different purposes in gas manipulation. To illustrate a practical aplication of my invention, I have selected two or three constructions embodying my invention and shall describe them hereinafter. The constructions selected, as examples, are shown in the accompanying drawings.

Fig. 1 is a front view of a compressor. Fig. 2 is an enlarged view of a section taken on the plane of the line 2—2 indicated in Fig. 1. Fig. 3 is a view of a section taken on the plane of the line 3—3 indicated in Fig. 1. Fig. 4 is a perspective view of a spring plate. Fig. 5 is a perspective view of a corrugated seal bearing supporting plate. Fig. 6 is a perspective view of an end thrust spring bearing member. Fig. 7 is an enlarged view of details of the machine shown in Figs. 2 and 3. Fig. 8 illustrates an enlarged cross section of a bearing seal assembly. Fig. 9 is a perspective view of a valve opening pin located in an auxiliary shaft of the construction. Fig. 10 is a view taken on the plane of the line 10—10 indicated in Fig. 7, and illustrates means for securing the main shaft of the compressor in position for temporary closure of the seal parts during removal. Fig. 11 illustrates a section of a modification of the oil sealed joint container as shown in Fig. 8. Fig. 12 is a view of a cross section illustrating a modified form of the sealed joint. Fig. 13 illustrates a modification of the spring plate shown in Fig. 4. Fig. 14 is a perspective view of a modified form of auxiliary shaft and illustrates a means for securing a bearing in position. Fig. 15 illustrates a further modified sealed joint. Fig. 16 is a view of a section taken on the plane of the line 16—16 indicated in Fig. 15. Fig. 17 is a view of a section taken on the plane of the line 17—17 indicated in Fig. 15. Fig. 18 is a view of a cross section of parts of the bearing and illustrates the position of the main shaft of the compressor upon interchanging of parts. Fig. 19 illustrates a section of the seal and shows the manner in which the interior of the seal may be connected through the housing to a source of supply exterior to the compressor.

As is well known in the art of mechanical refrigeration, one of the important problems, especially in the development of the compressor type, has been to prevent the loss of the refrigerant while passing through the compressor. Slight losses occur when the refrigerant mixes with the lubricant which is located within the compressor to reduce friction and prevent over-heating of the parts. In place of the ordinary stuffing box arrangement within the wall of the compressor, for the purpose of preventing leakage of the lubricant and the gas, more efficient sealing is produced by the coaction of a pressure of a flowable material produced by the pressure of the refrigerant, the flowable material having been kept out of contact with the material being sealed, and the pressure produced on the sealing ring other than that produced by the flowable material such as a pressure produced by a spring. To prevent the leakage of the refrigerant laden lubricant from within the compressor, a gas-free oil of heavier consistency, or other flowable material more or less immiscible to oil, may be used. The heavier oil, or other flowable material, preferably a lubricant, is located in an outer chamber and means is provided for preventing the leakage of the heavier oil and, consequently, the lighter gas laden oil and also the refrigerant in the inner chamber also will be prevented from leaking.

In the form of construction shown, a seal 1 is located in a shaft bearing plate 2, which may be secured to the compressor 3, by suitable screws 4. The bearing plate 2 rotatably supports one end of the main shaft 5 of the compressor, while the other end of the shaft is supported in a suitable bearing 6 formed in the opposite side wall of the compressor 3. The end of the shaft 5, located in the bearing 6, rotates against the convex surface of a concave spring disc 10. The spring disc 10 bears against a steel plate 11 and, having a smaller diameter than the inner diameter of the bearing 6, will have space for expansion when the shaft is forced inwardly. The shaft may be formed from solid material or may be formed from seamless tubing, which will possess sufficient strength to perform the necessasry operation while supporting other operating parts. Located on the shaft 5 is an eccentric member 7 which is connected to the piston rod 9.

In the form of construction shown, the driven shaft 5 is formed from seamless tubing and suitable plugs 12 and 13 are threaded into the ends of the shaft. The threaded plug 12 is internally threaded and an auxiliary shaft 14 is located in the outward end of the plug. On the outer end of the auxiliary shaft 14, a flanged member 15 is secured by a press, or shrink fit, and a fly wheel 16 may be connected to the member 15 by suitable bolts 17. The fly wheel 16 may be also provided with suitable blades 18 which operate to cool the compressor when operating. Formed in the peripheral surface of the fly wheel 16, there is the usual pulley belt groove 19, so located on the surface of the fly wheel that the plane of the center of the pulley belt groove will pass through the shaft 14 in proximity to its connection to the plug 12. The auxiliary shaft 14 is, preferably, formed from a high grade steel alloy to withstand the strain produced by irregular rotation of the parts connected on the outer end of the shaft.

The auxiliary shaft 14 has a threaded portion which may be screwed into the plug 12 located at the end of the shaft 5. It is also provided with an enlarged portion 56 and its outer end has a reduced cross-sectional area to which the flanged member 15, or the hub of the fly wheel 16, that operates the compressor, is connected. The fly wheel 16 is so constructed that when connected to the flanged member 15, the plane of the center of the pulley belt groove will pass through a point midway between the enlarged portion 56 and the flanged member 15. Preferably, the point of juncture, between the enlarged portion 56 and the outer end reduced cross-sectional area portion of the auxiliary shaft is joined by the curved surface that corresponds to the fillet, while the inner end of the hub, or flanged member, 15, has a curved surface that is located contiguous to the reduced cross-sectional area portion of the auxiliary shaft 14. The plane of the groove of the fly wheel 16 is, preferably, located substantially midway between these curved surfaces which greatly reduces the chance of fracture of the shaft by reason of any unusual strain that the shaft may be subjected to in its operation.

Where the invention is used in connection with compressors in refrigerating apparatus, and as is well known in connection with such apparatus, the refrigerant will, when agitated in the presence of oil, as where the oil is used for lubricating the compressor, become mixed with the oil and will, ordinarily, move with the oil and as the compressor is operated, the lubricating oil and some of the refrigerant is forced, or works, outwardly into the ends of the bearing plate 2 and the bearing 6. Suitable oil grooves 25 may be located in the bearings for free movement of the oil through the bearings. The mixture of oil and refrigerant working past the shaft 5, in the bearing plate 2, enters a recessed chamber 26 which is formed in the plate 2 and closed by the seal 1. To seal the openings through which the shaft 14 extends, a hardened and ground steel washer 27 is located at the point of connection of the shaft 14 and the plug 12 and a bearing ring 28 of self-lubricating bronze is secured in the seal 1 to maintain a constantly sealed bearing surface on one face of the washer 27. The bearing ring 28 is seated in a cup-shaped ring 29, the inner surface of which is serrated to securely hold the bronze ring 28. The cup ring 29 is secured to a bearing plate 30 by welding, soldering, or both, or may be formed integrally when the plate is die pressed. The portion 31 of the plate 30, between the ring 29 and the periphery of the plate, is made flexible and may be corrugated, as shown, to add flexibility to the seal bearing 28 when irregular wearing of the operating parts would otherwise cause an irregular pressure upon the bearing ring 28 as against the washer 27. Vertical displacement of the shaft 5, and in turn, the shaft 14 is allowed for by making the inner diameter of the ring 28 slightly greater than the outer diameter of the enlarged portion 56 of the auxiliary shaft 14. Also, a pair of plates 32 and 30' are located in spaced relation on either side of the plate 30 to limit its movement against pressures that may be applied on either side of the plate. A plate 35 having a plurality of radial spring pressed fingers 36 is also located in close proximity to the plate 30 and the fingers 36 extend angularly from the plane of the plate 35 to resiliently cooperate with the plates 30 by pressing against the surface of the plate 30 and supplying additional force to the contact between the bronze bearing 28 and the washer 27. The radial finger spring disc, or plate, 35, provides a means for producing a rapidly built up reactive force upon slight deflection. It allows for angular displacement of the sealing surface that may be produced by unequal wear of the bearings 2 and 6 caused by cocking of the shaft 5. Unlike a spiral spring, the radial finger spring plate 35 affords equal pressure around the periphery of the sealing ring 28 which produces a more even wear on the surfaces. The mixture of lubricating oil and refrigerant gas, forced past the bearing in the plate 2, by the pressure within the compressor, is caught in the chamber 26 and prevented from escaping by the sealing effect created between the washer 27 and the ring 28.

The lubricant mixed with refrigerant gas entering the bearing 6 and lubricating the surface of the shaft 5, is also slowly moved outwardly to the end of the bearing 6 by the pressure in the compressor. The plug 13 is provided, in its inner end, with a soft metal plug 40 and communicating passage-ways are drilled through the plugs 13 and 40 into the interior of the shaft 5. Between the inner ends of the plugs 12 and 13, a piston 41 is located and moved according to pressures of the gas located in the space between the plug 13 and the piston 41. The piston 41 is formed of a pair of leather washers 42 of greater diameter than the inner diameter of the shaft so that the edges will be bent to form cupped areas when forced against the interior walls of the shaft. The leather washers 42 are located between three metal washers 43 and are secured together by means of a pointed bolt and a nut 44.

When the main shaft 5 is assembled and located in the bearing 6 and the bearing plate 2, the space between the piston 41 and the plug 12 is filled with a heavy oil through a ball valve 48 located in the plug 49 which is threaded into the plug 12 from the outer end. As the end of the shaft 14 approaches the end of the plug 49, a pin 50, secured to the plate 51, forces the ball valve 48 open. The plate 51 is located in a recess 52 formed in the end of the auxiliary shaft 14. The plate 51 is provided with a plurality of radially extending slots 53 which allow the oil to flow through the recess 52 and into a passage-way 54 located in the horizontal axis of the shaft which connects the recess 52 with a passage-way 55 that is located in an enlarged portion 56 of the shaft 14 and at right angles to the passage-way 52. The passage-way 55 is thus formed in the section of the auxiliary shaft where its diameter is maximum and, consequently, decreases the likelihood of the fracture of the shaft by the formation of the passage-way. The outlets of the passage-way 55 are located in the periphery of the enlarged portion 56 of the shaft 14 and at a point beyond which the washer 27 is in contact with the bronze bearing 28. As the heavy oil is forced from the interior of the shaft 5 by the pressure of the gas located in the shaft between the plug 13 and the piston 41, it enters a chamber formed by the bearing plate 30 and a similar plate 60 which is spaced from the spring plate 35 to allow for ample deflection of the spring fingers 36. The plate 60 is also provided with a self-lubricating bronze bearing 61 which engages the shoulder formed by the enlarged portion 56 of the shaft 14. Similarly the bronze bearing 61 is provided with a larger inner diameter than the outer diameter of the smallest diameter of shaft 14 to allow for the vertical displacement of the shaft 14 due to bearing wear. The escape of the heavy oil located in the chamber 62 is prevented by the bearing ring 61, and the oil in said chamber is under the pressure of the gas between the piston 41 and the plug 13, and is forced against the plate 30 with a pressure substantially equal to the pressure of the refrigerant laden oil in the chamber 26. The leather washers, or cups, 42, of the piston 41, prevents any of the heavy lubricant from contaminating the lighter lubricant used for lubricating the inside of the compressor and also prevents the heavy sealing lubricant from coming in contact with the refrigerant. Thus the sealing is accomplished by the pressure of a fluid which is kept absolutely free from contamination of the refrigerant.

Similarly, the inner end of the bolt 44 will engage with the soft metal valvular seat 12', in the event of failure of the seal to function properly, which effectively prevents the escape of any of the refrigerant at this point. Thus, by my invention, escape of the refrigerant, in the event of failure of the seal parts, is eliminated.

The cover plate 62, which is bolted by the bolts 63 to the bearing plate 2, retains the seal 1 in position in the compressor. The plate 62 has a plurality of cork washers 64, located in its central portion, which have inner diameters slightly smaller than the smaller diameter of the body portion of the flanged member 15, to produce a tight fit of the elastic cork washers on the member 15. The cork washers 64 may be secured in this position by an expansion ring 65. The inner surface of the cover plate 62 has a concave, or dished, portion and, as the spring plate 66 is forced backward by any action of the machine, the radii of the fingers of the spring plate 66 will be shortened by contact with the plate 62 and thus add stiffness to their pressure and maintain the seal of the joint.

In the operation of the compressor, shown in the drawings, there are four pressure conditions to be considered. They are the high compressor pressure as, for example, from 50 to 100 pounds, the pressure at about atmospheric, or two or three pounds above atmospheric, the pressure well below atmospheric, and the pressure that is created by the injection of the heavy lubricant oil into the seal which may be run to an excessive pressure, as, for example, two or three hundred pounds. The pressures that exist in the operation of the machine, such as in the example taken, from 10 to 12 pounds below atmospheric to 100 pounds above atmospheric, there is, ordinarily, a rapid change in pressures due to the variations of temperature in the cooling unit, and the invention provides for the maintenance of the seal with the minimum wearing of the seal, notwithstanding the variations of the pressure that the seal may be subjected to.

During the conditions of high pressure in the compressor chamber, a pressure is produced on the inner end of the shaft 5 and its connected parts tend to force the shaft outward. The thrust will be equal to the pressure in the compressor times the smaller cross-sectional area of the auxiliary shaft 14. Resisting this thrust on the shaft is the sum of the thrusts produced by the plates 35 and 66. The plates 35 and 66 operate to build up a resistance rapidly upon slight deflection. The rapidity of the building up of the resisting force is increased by the proximity of the dished surfaces operating at the outer side of the spring plate 66 which shortens the radius of each finger progressively as it moves outward. Consequently, the thrust tending to expel the shaft 5 may be sufficient to move the shaft 5 a very minute distance away from the spring disc 10. The greater the shaft thrust becomes, the greater are the contact pressures against the sealing rings 28 and 61. The corrugated disc 60 bears against a stop plate 60' which is located in proximity to the outer side of the disc 60. The disc 60' thus holds the sealing ring 61 against the shoulder at the point of juncture of the enlarged portion of the auxiliary shaft with the portion having the smaller diameter. Pressure changes, due to operation of the compressor, do not have any thrust force on the plate 30 inasmuch as the pressure is maintained equal on both sides of the plate 30. Thus the main or inner seal is independent of the variable pressures or their intensities and whether positive or negative with reference to the pressure of the atmosphere. The pressure produced by the fingers of the spring disc 35 is sufficient to prevent the contamination of the lubricant within the chamber between the flexible discs 30 and 60 which prevents the gradual deterioration and eventually the escape of gas from the apparatus. The pressure of the refrigerant seal within the chamber coacts with the pressure of the spring disc 35 to render the sealing of the chamber in which the body of the shaft is located substantially perfect. Furthermore, the contamination of the sealing lubricant would otherwise cause the gradual deterioration of the lubricant for the purpose of sealing and ordinarily reduce viscosity which aids in its sealing action.

Under pressures at about atmospheric, as, for example, about 10 above, the shaft may be pressed against the spring disc 10 by the initial load in spring plates 35 and 66 during assembly. The amount of the initial loading will depend upon the pressure that is necessary to keep the sealing rings 28 and 61 in contact with the coacting sealing surfaces of the shaft to confine the fluids, notwithstanding any cocking of the shaft, or any unequal bearing wear or inaccuracy in the manufacture and assembly of the parts.

The spring disc 10 has a scale of deflection sufficient to cause the movement of the shaft 5 towards the bearing plate 2 as the seal surfaces become worn. When the screws 72 are tightened to effect a temporary shaft seal during repair, the disc 10 is correspondingly expanded against the resiliency of the marginal fingers. During this low pressure condition, the seal pressures are no greater than that required to keep the sealing rings in intimate contact with their respective sealing, or thrust, surfaces.

When the pressure is well below atmospheric, the pressure on the sealing ring 61 against its sealing or thrust surfaces, is again built up as the vacuum increases, from the fact that there is no stop disc on the inner side of the corrugated disc 60. The atmospheric pressure operates on the disc 60 to force the ring 61 against its sealing, or thrust, surface of the shaft 14. As the vacuum pressure attainable is limited, there is no danger in bursting the disc 60. The ratio of pressure change below atmospheric pressure is small compared with the high pressure changes. The chamber 62' is, preferably, also filled with a heavy oil and, moreover, oil that escapes from the other parts of the seal will lodge therein and, consequently, will assist in maintaining an efficient seal against air entering the compressor. This will prevent the entrance of air into the compressor which might otherwise cause damage to the material contained within, or operated upon, by the compressor.

The fourth pressure condition is where the chamber 62 is subjected to an exceedingly high pressure that may occur in filling the seal with the heavy oil, such as by the use of an oil gun. The limiting, or stop plate 32, on the compressor side of the corrugated plate 30, operates to sustain the pressure that the plate 30 is subjected to by such external pressure that may be produced within the chamber 62. If the plate 30 is distended to a material degree, it comes in contact with the stop plate 32. Also, the disc 60 will be sustained by the stop plate 60'. Thus the seal is protected from injury due to the excessive pressures that may be created by an oil or grease gun.

The seal, provided by my invention, is thus double in its operation in that, when one seal becomes entirely inoperative, the other seal will seal efficiently and prevent the discharge of the fluids operated upon by the apparatus. Should the outer seal become entirely inoperative and so as to destroy the balanced pressure condition existing, ordinarily between the chamber 62 and the compressor case, the piston 41 will expel its charge of the heavy viscous lubricant until the pointed pin 44 is seated in the valve plug 12' to close the outlet through the bearing parts of the shaft. Thus, no refrigerant fluid would escape by reason of failure of the outer sealing ring and its associated parts. In case of failure in operation of the outer sealing ring and its associated parts, the pressure produced in the base of the compressor will operate to press the disc 30 against its stop plate 30' in a manner similar to that in which the stop plate 60' functions with its associated flexible disc 60. Thus the inner sealing ring 28 is made increasingly effective when the outer sealing ring 61 fails to cooperate with the inner sealing ring 28 and its associated parts. Also, the wear on the sealing rings 28 and 61 will be divided which will maintain the life of the seal.

If the pressure in the compressor is less than atmospheric, the heavy lubricant, which is placed in and is forced in the chamber 67, and also such lubricant as is forced therein from the inner chamber into the said outer chamber 67 located in the outer side of the corrugated disc 60, will be forced or worked into the chamber formed on the inside of the disc 60. If desired, a heavy oil may be inserted in the outer chamber to produce sealings of the inner chamber as against admission of air. The outer chamber affords a collection chamber for any heavy lubricant that may be expelled in the operation of the compressor.

I have also provided a means whereby the auxiliary shaft 14, and the seal 1, may be removed in case of breakage and other parts of the compressor may still be sealed against leakage while repairs are being made and the seal joint is temporarily removed. In case the shaft 14 is broken in any portion extending outward from the flange 12, the fly wheel 16 may be removed from the flanged member 15 and the remaining stub of the shaft 14 may be turned until the notch 70, located in the flange 71 of the plug 12, may be engaged by the point of the screw pin 72. To provide sufficient pressure to force the main shaft 5 rearwardly and against the force of the thrust spring bearing 10, a plurality of screw pins 72 are, preferably, located in the bearing plate 2. (Fig. 10.) The cover plate 62 may then be removed and the seal 1 may also be removed. It will then be possible to remove the remaining portion of the shaft 14 from the plug 12 and, as the stub is being removed, the pin 50, extending from the plate 51, will withdraw from the ball valve 48 and thus allow the ball to close the oil passage from the interior of the shaft 5 and loss of the heavy oil, contained therein, will be thus prevented. Repairs may thus be readily made and parts reassembled without the loss of the refrigerating gas or the entrance of air into the system.

The heavy oil may be inserted in the chambers of the seal before or after the parts have been assembled. The heavy oil may be inserted through the oil fitting 73, which is located on the bearing plate 2, after the parts are assembled. The fitting communicates with the interior of the chamber 62 through passage-ways 73' that are formed in the bearing plate 2 and which communicate with a passage-way 62' that is formed in the seal 1. As the pressure in the chamber 62 builds up, the heavy oil will be forced through the passage-ways 54 and 55, formed in the auxiliary shaft 14, and through the slots 53 formed in the disc 51, and by the spring pressed ball, located in the plug 49, and into the interior of the main shaft 5. As the lubricant is fed into the interior of the shaft 5, the piston 41 will be forced back until the pointed pin 44 engages the plug 13 that is located in the end of the shaft 5. In order that the corrugated disc 30 may be protected as against the very high pressure that may be created in forcing the heavy lubricant through the passage-ways in the auxiliary shaft and into the main shaft 5, a rigid disc 32 is located in juxtaposed and substantially parallel relation to the corrugated disc 30 and so as to hold the corrugated disc 30 against undue distension by reason of the pressure that is created in the chamber 62. The rigid disc 32 thus forms a stop as against the undue expansion of the chamber 62 when subjected to the high pressure of the heavy lubricant.

Inasmuch as the various discs and spaced washers, that form the seal 1, are soldered or welded together, the seal constitutes a unitary structure and thus may be assembled as a unit in connection with the other parts of the apparatus. In assembling of the seal, a disc 11 is located in the interior of the bearing part 6 of the shell 3 of the compressor, and the dished spring disc 10 is so placed as to make peripheral contact with the disc 11. The main shaft 5, filled with a heavy lubricant, is connected to the eccentric 7 by a forced fit and is then positioned in the cover plate 2. The eccentric 7 is then located within the ring of the link 9, while at the same time the main shaft 5 is located in the bearing 6 of the shell 3. The cover plate 2 is then bolted to the shell 3 and so as to support the bearing parts formed on the shell 3 and in the plate 2 in proper alignment. The seal 1 is then placed on the auxiliary shaft 14 and the plate 62, with its corked seal 54, is located on the flanged member 15. The flanged member 15 is then forced with a press fit on the end of the auxiliary shaft 14. The threaded end of the auxiliary shaft 14 is inserted through the bearing ring 27 and the auxiliary shaft 14 is connected to the main shaft 5 by screwing its threaded end into the plug 12.

In case it is found desirable to replace the seal, or any of its cooperating parts, the main shaft 5 is sealed in its position in the wall of the compressor. The flange 71, of the plug 12, is forced against the surface of the recess 26 formed within the cover plate 2 and so that, by means of the gasket located between the opposing surfaces of the flange 71 and the cover plate 2, the interior of the compressor will be sealed. The flange 71 of the plug 12 is secured in this sealing position by means of the screws 72. In order to prevent the escape of material between the surfaces of the screws 72 and the cover plate 2, suitable caps 72' are threaded onto the outer ends of the screws 72. Suitable sealing washers may be located intermediate the caps 72' and the exterior surface of the cover plate 2. Also, in order to prevent the escape of materials located within the chambers of the compressor, the screws 72, preferably, fit very tightly in the tapped openings in the wall of the cover plate 2, while the caps 72' fit comparatively loosely on the threaded outer end portions of the screws 72.

In replacing any of the parts the caps 72' are removed from the outer ends of the screws 72 and, because of the difference of the tightness of the fitting of the parts of the screws 72, the screws 72 will be held in their position in the cover plate 2, while the caps 72' are removed from the outer ends of the screws 72. The screws 72 are then screwed into the cover plate 2 and so that their inner ends will engage the face of the plug 12. Preferably, the lower ends of the screws are pointed and have a diameter that is slightly smaller than the diameter of the threaded portion of the screws. Thus shoulders are formed at the inner ends of the threaded portions which are adapted to engage the edges of the flange 71 of the plug 12.

The shaft is rotated to a point such that one of the screws 72 will penetrate a slot 70. The registration as between the slot 70 with one of the screws 72 may be determined by screwing any one of the screws and rotating slowly the shaft until there is a slight frictional releasement as between the shaft and the end of the screw that has been thus started. Movement of the end of the screw into the slot will operate to press the shaft into the compressor and against the packing ring between the flange 71 and the cover plate 2. One of the other screws 72 is then forced into the cover plate 2 and its pointed end will engage the edge of the flange 71 and the flange will be farther forced against the packing ring. The third screw may then be inserted so as to lock the shaft in its sealing position produced by the operation of the other screws 72. The main shaft 5, having been secured in position, so as to seal the interior of the compressor, the parts exterior to the outer end of the main shaft 5 may be removed and replaced as desired.

In the form of construction shown in Fig. 11, wherein is illustrated a modified form of the seal joint, the bronze bearings 27 and 61 are secured in the flexible plates 30 and 59 by spinning the inner portion of the plates into and around the corner of the bearing. This operation forms a V-shaped groove in the surface of the plate where it is spun into the bearing. A suitable metal solder may thus be located in this groove and prevent the plate from spreading and thereby creating a loose condition between the bearing and the plate. The plates 35 and 66, which have finger spring portions bearing against the bearings 27 and 61, are spaced from the plates 35 and 66 by spacing rings 76, 77, and 78. The rings 76 and 77 are located on either side of the spring plate 35. The ring 77 is provided with an inwardly extending portion, or flange, which adds stiffness to the fingers by rapidly shortening their radii when any outward pressure deflects them.

In the constructions shown, an auxiliary shaft is connected to the main shaft in order to provide for the replaceability of the driving parts and the removability of that portion of the shaft in case of its being broken or the seal surfaces, for any reason, becoming inoperative. It also provides a means whereby the surface friction and, hence, power loss of a seal bearing may be greatly reduced. The small area of the sealing surface made possible by my invention, assures a high unit bearing pressure and this augments the sealing effect. Also, the circumference of the seal joint itself is greatly reduced in length which minimizes the area through which the fluids may escape or enter the compressor. A small cross-section of the auxiliary shaft maintains the thrust force produced with pressure changes at a minimum, thus assuring a smaller variation in the pressure acting upon the sealing surface. It is evident that the more viscous the outer liquid is, the less will be the difficulty of its retention. Also, the fact that the heavy lubricant is free from dissolved refrigerant, increases the effectiveness of the seal. Also in the construction when the end of the main shaft is subject to the pressure of the gas in the compressor, the smaller the diameter of the auxiliary shaft, the less will be the thrust that must be counterbalanced by pressure on the sealing surfaces.

Inasmuch as the seal is formed of parts that, when assembled, lie within closely placed planes extending at right angles to the shaft a relatively short auxiliary shaft may be used, which reduces the lateral dimensions required for the seal and permits the use of an auxiliary shaft of short length and, consequently, makes it possible to design the shaft quite entirely on the basis of the torsional strains to which it is subjected.

The plane of the belt of the fly wheel is located intermediate the enlarged portion 56 of the auxiliary shaft and the hub of the driving member 15, to reduce to a minimum the bending movement produced by the pull of the belt at the portion of the auxiliary shaft where the tortional stress is maximum. Preferably, the plane of the center of the belt is located midway between the enlarged portion 56 and the hub of the driving member 15.

In the modified form of construction shown in Figs. 12 to 14, inclusive, a modification of the seal joint is illustrated. The main shaft 91 is solid and is connected to auxiliary shaft 92 by a threaded collar 93. The auxiliary shaft 92 extends through the seal 96 and has, mounted on its outer end, an externally threaded collar 97 similar to the collar 93 on its inner end. Both collars may be secured to the shaft 92 by a shrink or press fit. The collar 97 is provided with a slot 98 in the outer end for easy mounting and removal of a pulley wheel 99. The wheel 99 has, located between its periphery and hub, a plurality of fan blades 100 which operate to cool the compressor.

The main shaft 91 has an eccentric 105 mounted on its central portion which may be keyed to the shaft in any suitable manner. The eccentric 105 is located within the ring portion of the piston arm 106 and thus the piston (not shown) will be caused to reciprocate with the compressor on rotation of the shaft.

Sufficient lubrication to the operating parts within the compressor is provided by a suitable oil well located in the base of the machine, and, as the parts rotate, the oil is splashed on the parts and into the bearings 108 and 109. The refrigerant, entering the compressor, mixes to some extent with the lubricant and, as this mixture works into the bearing 109 on the plate 110, its tendency is to leak out along the surface of the shaft. This action is prevented by the seal 96 which seals the joint of the shafts 91 and 92.

The central portion of the auxiliary shaft 92 is enclosed by the seal 96 which is located in the recessed portion of the bearing plate 110 and covered by a large nut 113. The nut 113 is threaded onto the outer surface of the plate 110 and may be locked against rotation by a set screw 114. The inner surface of the nut 113 slopes inwardly towards the compressor to form a shoulder for the spring plate 115 of the seal to add stiffness to the fingers by progressively reducing their radii as the thrust on shaft 91, caused by the gas pressure, outwardly deflects them. The inner ends of the fingers 116 extend at an angle slightly less than 90 degrees from the plane of the fingers and bear against an annular ring 117 which is flexibly supported on the disc 118. The disc 118 is of such a character that it will withstand the pressures imposed by the gas within the compressor and at the same time allow the hardened and ground annular seal bearing ring 117 some lateral, as well as angular, movement in conjunction with the support offered by the spring plate 115. The disc 118 is provided with a stop disc 119 on the outer side which assists disc 118 in withstanding extra high pressure and allows longitudinal and angular movement of the ring 117. The ring plate 117 is thus held against a bearing, preferably formed of self-lubricating bronze, which is secured in the central portion of the shaft 92. The central part of the shaft 92 is provided with an annular flange 121 and portions of the flange on either side are removed to form circular recesses for the ends of the bronze bearings 122 and 123. The sides of the recesses may be serrated to provide a more secure relation between the flange and the bearing material contained therein. The bearing 122 is therefore held in engagement with the ring 117 by the radial spring pressed fingers 116 formed in the plate 115 and the bearing 123 is held in engagement with a ring 125, similar to the ring 117, by pressure of a spring plate 126 against the ring 125. The ring 125 similarly is supported on a flexible disc 127 like that of 118 which allows ring 125 to move laterally and angularly with continuous contact between ring 125 and its bronze bearing 123. A spacing washer, or cylinder, 129, is provided between the plates 127 and 118. The central portion of the auxiliary shaft 92 is thus enclosed in the seal 96, the parts of the seal cooperating to form a sealed joint between the outer portions of the shaft and the bearing parts of the machine.

The seal may be assembled as a unit by welding or soldering together the component parts, such as the spring plate 115, the spacer member 120, the ring plates 118 and 119, the spacing member 129, the ring plate 127 and the spring plate 126.

The parts of the container 96 thus may be located in, or removed from, the recess of the plate 110 as a unit and, together with the shaft 92, may be readily removed from the compressor.

The interior of the seal is filled with a heavy lubricant and the seal is maintained full by the pressure from within the compressor. In the form of construction shown in Fig. 12, the bearing plate 110 that forms a part of the side wall of the compressor, is provided with a connection 134. A piece of tubing 135 is inserted in the connector and one end of the tube is secured to one end of a cylinder 136 containing viscuous lubricant. The cylinder 136 is provided with a piston 137 which is formed of a pair of leather washers and the cylinder is filled on one side of the piston with the heavy lubricant. As the amount of lubricant in the container 96 decreases, due to small losses, which may occur, the pressure in the tubing 135 forces the piston within the cylinder 136 against the body of the lubricant located therein and into a piece of tubing 135 which is connected to the end of the cylinder 136. The tubing 138 connects the cylinder to the interior of the seal 96 so that, as the heavy lubricant may leak out, a fresh supply will replace it and the amount in the seal 96 will be kept constant. Also, the pressure thus communicated by the movement of the lubricant to the interior of the seal will be equal to the pressure within the compressor since the pressure force actuating movement of the mixture of refrigerant gas and lubricating oil in the bearings will be the same as the pressure force in the tubing 135.

The equivalents of the pressure between the compressor lubricant on one side and the viscous lubricant in the seal on the other side, results in an effective seal between the bronze ring 123 and the thrust washer 125 with a minimum of seal pressure. Should sub-atmospheric pressure exist in the crank case, the outer disc 118 will automatically increase the pressure between the thrust washer 117 and the bronze sealing ring 122 which will set up a greater seal pressure between the sealing ring 123 and the washer 125. Under pressure conditions greater than atmospheric, the disc 118 will rest against the stop disc 119 and the outer seal will thus become more effective the greater the pressure produced in the crank case.

If the outer seal should become deficient in its operation, then the pressure on the inner seal will force the disc 127 and its associated bearing ring 125, more tightly against the sealing ring 123, the disc 127 and its associated spring plate 127 cooperating to produce the sealing pressure. The plate 139 is provided with an annular ridge 139' concentric with the plate 139 which automatically shortens the radii of the spring fingers of the disc 126. The rings 117 and 125 are provided with a slight clearance so that any eccentricity of the shaft 92, due to bearing wear or an imperfection in manufacture, will not impose a strain on the respective supporting discs.

If breaking or imperfect operation of the parts should necessitate a replacement, the pulley wheel 99 is removed from the collar 97, the nut 113 from the plate 110, and the end of the tubing 138 is withdrawn from the seal 96, the tubing having been pinched closed previously. The seal 96 may then be removed from the plate 110 by the removal of the auxiliary shaft 92 from its position in the shaft 91. The parts may then be quickly and easily replaced and the compressor drive reassembled, without dismantling or removing the entire compressor.

In order to prevent the leakage of refrigerant gas during the dismantling of the compressor, the main shaft 91 is forced against a soft metal gasketed bearing plate 139 by a bolt 140 which is located in a plug 141. Also, since the heavy lubricant contained within the container may find chance for escapement upon the breaking of parts, the bolt which secures parts of the piston 137 together is provided with a pointed end and as the lubricant contained within the cylinder 136 is forced into the tubing 138, by the unequalizing of the pressures, the point of the bolt will enter a soft conical seated metal plug in the connection to the tubing 138 and, by thus closing the passageway, will prevent the escape of the refrigerant gas through the tubing 135 and 138. The construction shown in Figs. 1 and 14 is such as to provide for the differences in operating pressures within the compressor which varies from a very high pressure to a pressure well below atmospheric and to maintain a sealing pressure in the seal bearings, that is proportioned to the pressure either positive or negative relative to atmospheric, without necessitating an extremely high seal bearing pressure when the pressure within the compressor is low. This results in greater seal effectiveness and reduced seal wear.

A further modification for the seal joint is illustrated in Fig. 15 wherein the viscous lubricant container is constructed in the form of a series of concentric cups which are maintained in close relation to the auxiliary shaft. The main shaft 150 is rotatably mounted in a pair of bearings 151 and 152. The bearings 151 and 152 are formed in the side walls of the compressor 153 and are provided with suitable oil grooves 154 which allow for the movement of the lubricant to the surface of the shaft 150 located in the bearings. The usual eccentric 155 is located in a central portion of the shaft 150 and may be keyed to the shaft. The piston rod 156 connects the eccentric 155 and the piston 157 in the usual manner.

In order to afford proper driving connection to the shaft 150, a belt groove 160, located on the periphery of the fan wheel 161, is provided. The fan wheel 161 is composed of a plurality of angularly positioned blades 162 which extend from the body portion of a cup-shaped member 164. The member 164 is keyed to the outer end of the auxiliary shaft 165 and secured on the tapering surface 166 of the shaft by the nut 167. The inner end of the shaft 165 is located in a plug 168 that is threaded into the main shaft 150 and is connected to the auxiliary shaft 165 by a shrink, or press, fit.

The arrangement of the various elements is such that the center of the pulley groove 160 is located directly in the plane of the outer connection between the auxiliary shaft 165 and the press fit plug 168. This location gives a minimum bending moment at the connection between shaft 165 and plug 168. This is desired because the shaft here is of small diameter and is less capable of standing any bending moment in addition to the torsional stresses imposed. At the line 16—16 the cross section of the auxiliary shaft 165 is formed increased to form a bearing shoulder and this portion is specifically better suited to take combined torsional and bending stresses as the section is enlarged gradually whereas, at the outer end of the plug 168, there is a somewhat sharper shoulder which tends to give rise to localized strains. Thus the shaft 165 is subjected substantially to torsional stresses in that portion of its length that has the smallest diameter. Owing to the shortness of the portion of the shaft through which the plane of the groove of the driving pulley extends, and the smallness of the diameter of the shaft at this point, the bending moments may be quite entirely eliminated in the design of the shaft and, consequently, the design of the shaft may be entirely on the basis of the torsional stresses to which it is subjected.

The belt will be located, and consequently the driving force of the belt will be applied, in a plane located close to the plug 168. The shaft 165 may also be formed of a high grade of steel alloy to produce a sufficiently strong metal to withstand the strains placed thereon by any irregular rotation of the parts of the compressor.

The central portion of the auxiliary shaft is located within a seal so as to prevent the escape of the refrigerant gas and the lubricating oil located within the compressor. The seal is in the form of a cup having an opening in its end through which the shaft 165 extends. The cup 170 is secured to the wall of the compressor 153 by suitable bolts 171 and is spaced from a second or smaller cup 172 by a suitable gasket washer 173. Additional gasket washers are also located between the cup 172 and the wall of the compressor and between the outer surface of the cup 170 and the bolts 171 to provide a sealed condition at this portion of the seal.

The interior of the cup 170 is, preferably, maintained full of a heavy lubricating oil that may be inserted therein by any suitable means. In the form of construction shown, the cup 170 is maintained in its filled condition and subject to a pressure equal to that created by the gas in the base of the compressor by means of an expansion bellows 175 which is subjected to the gaseous pressure created in the base of the compressor. The mechanical bellows 175 is located in a shell 176 that is closed by a cap 177. The shell 176 is connected to the base of the compressor by means of the pipe 178 through which gas is admitted to the interior of the shell from the interior of the base of the compressor. The interior of the mechanical bellows 175 communicates with the interior of the cup 170 through the pipe 179 and the interior of the mechanical bellows 175, the pipe 179, and the cup 170 are filled with a heavy lubricant and, consequently, the pressure created in the base of the compressor operates on the mechanical bellows to subject the heavier oil to the pressure in the base of the compressor and thus maintains the cup 170 full of the heavier lubricant. In event of the failure of the seal, the bellows 175 will collapse and prevent flow of gas out through the seal.

The pressure within the base of the compressor is transmitted to the film of oil that is gathered by splashing of the eccentric, between the bearing parts of the shaft 150 and its supporting bearings, and, although this pressure is transmitted to the end of the shaft 150, the oil in the bearing parts does not escape since the shaft and its surrounding parts are so constructed that the pressure on the oil between the bearing parts is counteracted by the heavier oil that is forced into the cup 170 by the action of the same pressure on the mechanical bellows 175.

The outer end of the shaft bearing 152 is closed by a plug 185 and the pressure produced in the base of the compressor is transmitted to the end of the shaft 150 and presses the hardened ground and polished end of the plug 168 against the self-lubricating bronze bearing member 186 that is supported in an elastic flexible disc 187 that closes the opening formed in the bottom of the cup 172. The edge of the disc 187 is secured to the edge portion of the cup 172 about the opening through which the auxiliary shaft 165 extends. Inasmuch as the outer side of the disc 187 is subject to the pressure of the heavier oil in the cup 170, the force on the opposite end of the shaft 150 is sustained by the bearing member 186.

In order to prevent the escape of any material amount of the heavier oil from the cup 170, a spider 190 is located on the slender portion of the auxiliary shaft 165, the collar has a graphitized bronze bearing 191 suitably connected thereto, and the auxiliary shaft 165 has a rounded shoulder 192. A plurality of equally spaced springs 193 interconnect the bottom of the cup 170 with the ends of the arms of the spider. The springs 193 are tension springs and operate to press the bearing 191 against the shoulder 192 to quite effectually seal the shaft as against escape from the heavier lubricant along the surface of the shaft towards the outer end.

The function of using a plurality of equally spaced tensioned springs 193 in place of one spiral spring, is to secure equal bearing pressure around the entire periphery of seal bearing 191. In assembly, each spring is attached to a spring scale after being drawn through the small hole provided in the end of the cup 170 and extended until each has the same identical initial tension loading. The tension to which each of these springs are drawn equally must be such that the total force or thrust produced axially along the line of the small shaft 165 will balance the maximum suction produced in the compressor base when the latter is functioning under its lowest vacuum conditions. As the pressure is built up in the compressor base the tendency of the sealing force, between the bearing 191 and the shoulder 192, is proportionally increased. In this manner the sealing effect is maintained notwithstanding the increase of pressure. The sealing of the seal becomes greater as the pressure increases. In the form of construction shown, the pressure in the compressor is, normally, slightly above or below atmospheric during the machine's ordinary operating range. The high pressures exist only when the machine is not in operation. At this time the pressure builds up to the vapor pressure corresponding to the room temperature in which the machine is located. This is the period during which there is the greatest likelihood of escape of refrigerant vapor. Under such conditions the seal becomes increasingly effective with the rise in pressure. The thrust produced by an increasing pressure forces the sealing ring 192 more tightly against its corresponding shoulder 191 and this pressure is in turn borne by the bearing end of the plug 168 against the thrust ring 186.

As the machine is operated and the temperature in the cooling chamber drops, there is a corresponding decrease in pressure in the crank case of the compressor, with the result that the force tending to seal the gas becomes regulated according to the tendency of the vapor to escape.

In order to provide for possible variations from true alignment between the auxiliary shaft 165 and the main shaft 150, a flexible cylinder, or mechanical bellows, 194, may be connected to the central portion, or hub, of the spider 190 and the edge portion of the cup 170 about the opening through which the auxiliary shaft 165 extends, which permits, if required, a lateral and angular movement of the outer end of the auxiliary shaft 165 relative to the outer end of the cup 170 and will accommodate together with outer lateral displacement of the main shaft 150 for bronze seal wear.

In case it is desired to remove the auxiliary shaft 165, for any purpose, it may be done by securing the shaft 150 against a soft metal gasketed shoulder, thus preventing the otherwise free ventation of the gas of the system and which would ordinarily result in great injury and damage, or in the introduction of air and moisture into the system. In the form of construction shown, the plug 185 is provided with a threaded pin 200 and the shaft 150 is provided with a tapped opening 201 located in alignment with the pin 200. When, therefore, it is desired to remove the seal located at the opposite end of the shaft 150, the pin 200 is rotated in the plug 185 until it engages the threads of the tapped opening 201. The auxiliary shaft 165 may then be removed without fear of fluid entering or leaving the compressor. The parts pertaining to the shaft 165 may then be dismantled by removing the nuts and screws that interconnect these parts and rotating the shaft so as to remove the plug 168 from the end of the shaft 150. Whereupon such repair, as may be desired, may be performed.

In the claims where "pressure" is used, I have reference to any pressure, either negative or positive, with respect to atmospheric, unless otherwise designated.

I claim:

1. In a fluid seal for relatively moving parts of an apparatus, a chamber, a shaft located in the chamber and a bearing part for rotatably supporting the shaft, the space between the bearing part and the shaft communicating with the interior of the chamber, thrust bearing members for engaging an end part of the shaft, a member for pressing the end of the shaft against the thrust bearing members, a second chamber, the end part of the shaft located in the said second chamber, a fluid located in the second chamber means for subjecting the fluid to a pressure which coacts to sustain the end thrusts of the thrust bearing members against the end part of the shaft.

2. In a fluid seal for relatively moving parts of an apparatus, a chamber, a shaft located in the chamber and a bearing part for rotatably supporting the shaft, the space between the bearing part and the shaft communicating with the interior of the chamber, thrust bearing members for engaging an end part of the shaft, members for pressing the thrust bearing members against the end part of the shaft, a second chamber, the end part of the shaft located in the second chamber, a fluid located in the second chamber, and means for subjecting the fluid to a pressure to coact in the sustainment of the end thrust of the shaft.

3. In a fluid seal for relatively moving parts of an apparatus, a chamber, a shaft located in the chamber and a bearing part for rotatably supporting the shaft, the space between the bearing part and the shaft communicating with the interior of the chamber, thrust bearing members for engaging an end part of the shaft, members for pressing the thrust bearing members against the end part of the shaft, a second chamber, the end part of the shaft located in the said second chamber, a fluid located in the second chamber, and means for subjecting the fluid to the pressure within the first named chamber for the coactive sustainment of the end thrust of the shaft.

4. In a gas seal for relatively moving parts of an apparatus, a chamber having a bearing part formed in its wall and for containing gas under pressure, a shaft located in the chamber and rotatably supported in the bearing part and movable endwise, end thrust bearing members for engaging the end of the shaft, for resisting endwise movements of the shaft, and means for elastically sustaining each of the end thrust bearing members against the end thrust of the shaft produced by the pressure of the gas in the chamber.

5. In a fluid seal for relatively moving parts of an apparatus, a chamber for containing a fluid under pressure and having a bearing part in its wall, a shaft rotatably supported in the bearing part, an auxiliary shaft connected to the end of the first named shaft, the auxiliary shaft having surfaces extending transversely to the axis of the shaft, and a plurality of bearing members located in contact with the said surfaces, and means for pressing each of the second named bearing members against the said surfaces and in the same direction and in the direction of the axis of the auxiliary shaft for preventing the passage of fluid between the shaft and the bearing parts.

6. In a gas seal for relatively moving parts of an apparatus, a chamber for containing a gas under pressure and having a bearing part in its wall, a shaft rotatably supported in the bearing part, a lubricant contained within the chamber for lubricating the shaft, a seal comprising a pair of endwise thrust bearing members for engaging end parts of the shaft, a pair of flexible discs connected to the bearing members, and means for elastically pressing the bearing members against the shaft, a fluid located between the flexible discs, and means for subjecting the fluid between the discs to the pressure of the gas of the chamber independent of the flexure of the discs produced by the gas of the chamber and coacting with the said elastic means for preventing the escape of the lubricant from the chamber.

7. In a gas seal for relatively moving parts of an apparatus, a chamber for containing a gas under pressure and having a bearing part in its wall, a shaft rotatably supported in the bearing part, a lubricant contained within the chamber for lubricating the shaft, a removable seal comprising a shell having an endwise thrust bearing member for engaging an end part of the shaft, a flexible disc closing one end of the shell and connected to the bearing member, a lubricant contained within the shell, and means for subjecting the lubricant to a pressure substantially the same as that of the gas within the chamber.

8. In a gas seal for relatively moving parts of an apparatus, a chamber for containing gas under pressure, the wall of the chamber having a bearing part, a shaft rotatably supported in the bearing, a seal comprising a pair of spring pressed flexible discs and thrust bearings connected to the flexible discs, the shaft having bearing surfaces located in planes at right angles to the axis of the shaft and which are pressed against the thrust bearings by the pressure of the gas in the chamber.

9. In a fluid seal for relatively moving parts of an apparatus, a chamber, a shaft located in the chamber and a bearing for supporting the shaft, a pair of thrust members for engaging the end parts of the shaft an forming walls for preventing the escape of the fluid in the chamber, and an elastic member for pressing each of the bearing members against the end parts of the shaft in the same direction.

10. In a fluid seal for relatively moving parts of an apparatus, a chamber, a shaft located in the chamber and a bearing for supporting the shaft, a pair of thrust members for engaging the end parts of the shaft and forming walls for preventing the escape of the fluid in the chamber, flexible diaphragms, one connected to each of the bearing members, and an elastic member for pressing each of the bearing members against the end parts of the shaft and in the same direction, the flexible diaphragms forming a chamber, a lubricant located in the chamber between the diaphragms, and means for subjecting the lubricant to a pressure by the pressure of the fluid in the first named chamber for pressing one of the bearing members in the same direction that it is pressed by its associated elastic member.

11. In a fluid seal for relatively moving parts of an apparatus, a chamber for containing the fluid, a shaft located in the chamber and a bearing for supporting the shaft, thrust bearing members for engaging end parts of the shaft, a second chamber surrounding the end part of the shaft, a lubricant liquid located in the second chamber to prevent free movement of the fluid of the first named chamber between the bearings and the shaft, and means for subjecting the lubricant liquid to a pressure produced by the pressure in the first named chamber.

12. In a fluid seal for relatively moving parts of an apparatus, a chamber, a shaft located in the chamber and a bearing part for rotatably supporting the shaft, the space between the bearing part and the shaft communicating with the interior of the chamber, thrust bearing members for engaging an end part of the shaft, a member for pressing the thrust bearing members against the end part of the shaft, a second chamber, the end part of the shaft located in the second chamber, a fluid located in the second chamber, and means for subjecting the fluid in the second chamber to a pressure equal to that of the pressure in the first named chamber and by the pressure of the fluid in the first named chamber and in a direction to coact in the sustainment of the end thrust of the shaft.

13. In a gas seal for relatively moving parts of an apparatus, a chamber for containing a gas under pressure and having a bearing part in its wall, a shaft rotatably supported in the bearing part, a lubricant contained within the chamber for lubricating the shaft, a removable seal comprising a shell having a pair of flexible discs extending across the shell, a pair of thrust bearing members for engaging end parts of the shaft and connected to the flexible discs, a pair of elastic members supported by the shell and having parts each for engaging a bearing member to press the bearing member against the end parts of the shaft and inwardly with respect to the first named chamber, a lubricant contained within the shell and between the flexible discs, and means for subjecting the lubricant to a pressure substantially the same as that of the gas within the chamber and by the pressure of the gas in the chamber.

14. In a gas seal for relatively moving parts of an apparatus, a chamber for containing a gas under pressure and having a bearing part in its wall, a shaft rotatably supported in the bearing part, a lubricant contained within the chamber for lubricating the shaft, a removable seal comprising a shell having a pair of flexible discs, the periphery of the discs secured in the wall of the shell, each disc having an endwise thrust bearing member surrounding the shaft for engaging an end part of the shaft, a spring disc having its periphery secured in the wall of the shell and having parts thereof for engaging each bearing member, a lubricant contained within the shell, and means for subjecting the lubricant to a pressure substantially the same as that of the gas within the chamber and by the pressure of the gas in the chamber.

15. In a lubricant seal, a shaft, a shell surrounding an end part of the shaft, a flexible disc surrounding the shaft and having its periphery secured in the shell, an end thrust bearing surrounding the shaft and connected to the flexible disc, a second disc surrounding the shaft and secured in the shell for limiting the outward movement of the flexible disc and the bearing, a spring member for pressing against the bearing to maintain an end thrust of the bearing on the shaft.

16. In a seal joint, a rotatable member, means actuating to move the rotatable member with reference to the joint, a housing for supporting the rotatable member, a plurality of screws extending into the housing and in a direction substantially at right angles to the axis of rotation of the rotatable member, one of the screws having a conical point and the rotatable member having a surface whereby one of the screws may be threaded into the housing to engage the surface, the other of the screws located in position to engage the end surface of the rotatable member whereby the rotatable member may be moved endwise by the screw having the conical end and locked in position by the plurality of screws.

17. In a fluid seal for relatively moving parts of an apparatus, a chamber for containing the fluid, a shaft located in the chamber and a bearing for supporting the shaft, thrust bearing members for engaging end parts of the shaft, a second chamber surrounding the end part of the shaft, a lubricant liquid located in the second chamber and free from the fluid contained in the first named chamber, and means for pressing the thrust bearing members against the end part of the shaft to prevent movement of the fluid from the first named chamber into the lubricant of the second named chamber and means for maintaining the first named chamber filled with a lubricant.

18. In a gas seal for rotative members supported in housings, a shaft rotatably supported in the housing and comprising a main body part and a removably connected auxiliary part, the auxiliary part of the shaft having a shoulder part, an end thrust bearing member surrounding the auxiliary part of the shaft, means for pressing the shoulder part and the end thrust bearing member against each other, and means for securing the main body part of the shaft from rotation for the removal of the auxiliary part of the shaft and the said end thrust bearing member.

19. In a gas seal for rotative members supported in housings, a shaft rotatably supported in the housing and comprising a main body part and a removably connected auxiliary part, the auxiliary part of the shaft having a shoulder part, an end thrust bearing member surrounding the auxiliary part of the shaft, means for pressing the shoulder part and the end thrust bearing member against each other, the housing having a sealing part for engaging an end part of the main body part of the shaft, means for securing the main body part of the shaft from rotation and for forcing the main body part of the shaft against the said sealing part for the removal of the auxiliary part of the shaft and sealing the space about the end part of the main body part of the shaft.

In witness whereof I have hereunto signed my name to this specification.

PHILIP W. DES ROCHES.